United States Patent
Webb

(10) Patent No.: US 9,432,898 B2
(45) Date of Patent: Aug. 30, 2016

(54) UNSCHEDULED MESSAGES

(71) Applicant: Neul Ltd., Cambridge (GB)

(72) Inventor: William Webb, Cambridge (GB)

(73) Assignee: NEUIL LTD., Cambridge (GB)

( * ) Notice: Subject to any disclaimer, the term of this patent is extended or adjusted under 35 U.S.C. 154(b) by 24 days.

(21) Appl. No.: 13/916,959

(22) Filed: Jun. 13, 2013

(65) Prior Publication Data

US 2013/0281102 A1 Oct. 24, 2013

Related U.S. Application Data

(63) Continuation of application No. PCT/EP2012/059332, filed on May 21, 2012.

(30) Foreign Application Priority Data

| Jun. 13, 2011 | (GB) | 1109829.0 |
|---|---|---|
| Jun. 13, 2011 | (GB) | 1109830.8 |
| Jun. 13, 2011 | (GB) | 1109836.5 |
| Jun. 13, 2011 | (GB) | 1109837.3 |
| Jun. 13, 2011 | (GB) | 1109840.7 |
| Jun. 13, 2011 | (GB) | 1109844.9 |
| Jun. 13, 2011 | (GB) | 1109848.0 |
| Jun. 13, 2011 | (GB) | 1109850.6 |
| Jun. 13, 2011 | (GB) | 1109853.0 |
| Jun. 13, 2011 | (GB) | 1109854.8 |
| Jun. 13, 2011 | (GB) | 1109863.9 |
| Jun. 13, 2011 | (GB) | 1109867.0 |
| Jun. 13, 2011 | (GB) | 1109874.6 |
| Sep. 30, 2011 | (GB) | 1116910.9 |
| Dec. 21, 2011 | (GB) | 1122036.5 |

(51) Int. Cl.
*H04W 72/00* (2009.01)
*H04W 36/22* (2009.01)
(Continued)

(52) U.S. Cl.
CPC ............. *H04W 36/22* (2013.01); *H04B 1/713* (2013.01); *H04L 5/0032* (2013.01); *H04L 7/041* (2013.01);

(Continued)

(58) Field of Classification Search
CPC .. H04M 7/128; H04M 11/04; H04M 1/6041; H04M 1/7255; H04M 3/42042
USPC ........... 455/552.1, 41.1, 569.1, 456.3, 404.1, 455/41.2, 41.3, 417, 412.1, 445, 425, 456.1, 455/422.1, 519, 63.1, 12.1, 573, 432.1, 455/277.1, 561, 11.1, 539.11
See application file for complete search history.

(56) References Cited

U.S. PATENT DOCUMENTS 7,844,286 B1 * 11/2010 Sennett et al. ................ 455/466
2003/0186653 A1 * 10/2003 Mohebbi et al. .......... 455/67.11

(Continued)

FOREIGN PATENT DOCUMENTS

| EP | 1401226 A1 | 3/2004 |
|---|---|---|
| JP | 201285011 A | 4/2012 |

(Continued)

OTHER PUBLICATIONS

Cohen et al., "A Scalable Scheme for Preventing Feedback Implosion in a Large-Scale Multi-Tier Sensor Network," 7th Annual IEEE Communication Society Conference, IEEE, Jun. 21, 2010, 9 pages.

(Continued)

*Primary Examiner* — Joseph Arevalo
(74) *Attorney, Agent, or Firm* — Slater Matsil, LLP

(57) ABSTRACT

A communication device for communicating with a plurality of terminals, the communication device being configured to determine that a network event will affect the plurality of terminals and could trigger each of those terminals to attempt to transmit information relating to the network event to the communication device and arrange so that only a subset of the plurality of terminals will attempt to transmit in response to the network event.

18 Claims, 7 Drawing Sheets

(51) Int. Cl.

| | | |
|---|---|---|
| *H04L 12/801* | (2013.01) | |
| *H04L 7/04* | (2006.01) | |
| *H04L 25/06* | (2006.01) | |
| *H04W 4/00* | (2009.01) | |
| *H04W 64/00* | (2009.01) | |
| *H04W 72/12* | (2009.01) | |
| *H04B 1/713* | (2011.01) | |
| *H04L 5/00* | (2006.01) | |
| *H04W 8/18* | (2009.01) | |
| *H04W 56/00* | (2009.01) | |
| *H04W 36/00* | (2009.01) | |
| *H04W 72/04* | (2009.01) | |
| *H04W 28/06* | (2009.01) | |
| *H04W 24/02* | (2009.01) | |
| *H04L 29/08* | (2006.01) | |
| *H04L 29/06* | (2006.01) | |
| *H04B 7/26* | (2006.01) | |
| *H04W 16/14* | (2009.01) | |
| *H04W 88/10* | (2009.01) | |
| *H04W 12/06* | (2009.01) | |

(52) U.S. Cl.
CPC ............ *H04L 25/061* (2013.01); *H04L 47/10* (2013.01); *H04L 67/28* (2013.01); *H04L 69/18* (2013.01); *H04W 4/005* (2013.01); *H04W 8/18* (2013.01); *H04W 24/02* (2013.01); *H04W 28/065* (2013.01); *H04W 36/0066* (2013.01); *H04W 56/001* (2013.01); *H04W 56/0015* (2013.01); *H04W 64/00* (2013.01); *H04W 72/048* (2013.01); *H04W 72/1215* (2013.01); *H04W 72/1242* (2013.01); *H04B 7/2656* (2013.01); *H04W 12/06* (2013.01); *H04W 16/14* (2013.01); *H04W 88/10* (2013.01); *Y04S 40/24* (2013.01)

(56) References Cited

U.S. PATENT DOCUMENTS

| | | | |
|---|---|---|---|
| 2004/0232277 A1* | 11/2004 | Gehlot | F41G 7/346 244/3.19 |
| 2005/0111452 A1 | 5/2005 | Mamillapalli et al. | |
| 2006/0009191 A1* | 1/2006 | Malone | H04W 4/22 455/404.1 |
| 2006/0023691 A1 | 2/2006 | Franchuk et al. | |
| 2008/0096518 A1* | 4/2008 | Mock et al. | 455/404.1 |
| 2008/0129497 A1* | 6/2008 | Woodard et al. | 340/540 |
| 2009/0052363 A1* | 2/2009 | Matsue et al. | 370/312 |
| 2009/0247111 A1* | 10/2009 | Sennett | H04W 76/007 455/404.1 |
| 2009/0247189 A1* | 10/2009 | Sennett et al. | 455/456.2 |
| 2009/0279464 A1* | 11/2009 | Kakani et al. | 370/311 |
| 2010/0124898 A1* | 5/2010 | Qu et al. | 455/404.1 |
| 2011/0064021 A1 | 3/2011 | Patini | |
| 2011/0270984 A1 | 11/2011 | Park | |
| 2011/0319129 A1* | 12/2011 | Bhat et al. | 455/552.1 |
| 2012/0014305 A1* | 1/2012 | Kakani et al. | 370/311 |
| 2012/0294146 A1 | 11/2012 | Wu | |
| 2012/0295575 A1* | 11/2012 | Nam | 455/404.1 |
| 2012/0313760 A1* | 12/2012 | Okano | 340/10.1 |
| 2013/0035064 A1* | 2/2013 | Balachandran et al. | 455/411 |
| 2013/0155994 A1 | 6/2013 | Yoshizawa et al. | |
| 2014/0253326 A1* | 9/2014 | Cho | H04W 4/22 340/539.13 |

FOREIGN PATENT DOCUMENTS

| | | |
|---|---|---|
| JP | 2013507809 A | 3/2013 |
| JP | 2013527695 A | 6/2013 |
| JP | 2013528985 A | 7/2013 |
| WO | 2007/005030 A2 | 1/2007 |
| WO | 2011042370 A1 | 4/2011 |

OTHER PUBLICATIONS

Wu et al., "A Comparison of Multicast Feedback Control Mechanisms," Proceedings of the 38th Annual Simulation Symposium (ANSS '05), IEEE, Apr. 4, 2005, 8 pages.

* cited by examiner

UNSCHEDULED MESSAGES

BACKGROUND

The invention relates to the sending of unscheduled messages in response to a network event.

The majority of communication devices are primarily intended to communicate data whilst they are being operated by a nearby user. For example, a typical telephone or personal computer is designed to allow a user who is holding, or is at least near to, the device to speak or type data into the device and to communicate that data to a user at another location. However, it is anticipated that there will be an increase in the number of devices that communicate automatically without a user being in attendance. For example, it has been forecast that in the future devices such as domestic appliances, motor vehicles and utility meters will commonly be capable of sending data to report on their operational state and receiving data such as upgraded operating software.

A communication network for machine-to-machine (M2M) communications may comprise a base station and one or more terminals with which the base station is required to communicate. The base station suitably shares the available communication resource between the terminals (which may number several thousand if the geographical area covered by the base station is large).

The protocol for the wireless link between the base stations and the terminals is suitably one that is optimized for M2M communication. Preferably the protocol also operates in so-called whitespace: a part of the spectrum that is made available for unlicensed or opportunistic access. Conveniently, that may be in the UHF TV band which spans all or part of the range from 450 MHz to 800 MHz, depending on the country. A large amount of spectrum has been made available for unlicensed wireless systems in this frequency range. A problem with operating in whitespace is that the available bandwidth is variable and cannot be guaranteed. These limitations are well-matched to the capabilities of M2M in which there is no human interaction. M2M networks are typically tolerant of delays, dropped connections and high latency communications.

In an M2M network the vast majority of the traffic is scheduled. This scheduled traffic may include periodic meter readings, sensor updates, signal readings etc. However, terminals may also be programmed to send unscheduled alerts under certain conditions, such as a power failure. The terminals may treat the alert messages as messages that should be transmitted as soon as possible. The network may be designed to make provision for the terminals to schedule this type of message by allocating a part of every frame to contended access transmissions. However, some of the alert conditions may be geographically widespread, with the result that a large number of contended access "alert" messages may be transmitted. This could be problematic for the network.

A simple solution is to require alert messages to have a large "back-off". Under this arrangement the terminal generates a random delay for any alert, and waits the duration of that random delay before transmitting its alert message. If the range of the potential delays is sufficiently large then the contended access messages from a large number of terminals will be sufficiently spread out in time to avoid network congestion. However, this approach will inherently result in some long delays in receiving alert messages which may not be acceptable to the operators of the terminals. For example, owners of electricity networks may wish to know within a few seconds whether there has been a power failure. Furthermore, even if it is successful in spreading the load, this arrangement may still result in a large quantity of unnecessary network traffic.

Another example of an event that can trigger a flood of unscheduled messages is the transmission of broadcast data by a base station. Broadcast data is sent to multiple terminals. Often, some of those terminals will require all or part of the data to be retransmitted because they did not receive all of it successfully. One option would be to simply retransmit the data a fixed number of times in the hope that all of the terminals receive it. However, this is not reliable. There may be instances when a fixed number of retransmissions is still not sufficient for all of the terminals to have received all of the data. This option may also be inefficient, as it involves retransmitting all of the data when at least some of the data may have been received successfully by all of the terminals. A further option would be for the base station to check with each individual terminal whether it needs any parts of the data to be retransmitted. This can take a long time, particularly on a busy base station. The preferred option is therefore for the base station to accept contended access messages back to the base station from terminals requesting retransmission of some or all of the broadcast message. In a busy network the base station could be flooded with contended access retransmission requests. If many terminals try to send their retransmission requests at the same time, it is possible that the base station will not receive any of them.

Therefore, there is a need for a mechanism for dealing with the large number of messages that may be triggered by a network event in a communication network.

SUMMARY

According to a first embodiment of the invention, there is provided a communication device for communicating with a plurality of terminals, the communication device being configured to determine that a network event will affect the plurality of terminals and could trigger each of those terminals to attempt to transmit information relating to the network event to the communication device and arrange so that only a subset of the plurality of terminals will attempt to transmit in response to the network event.

The communication device may be configured to anticipate that the network event may trigger the plurality of terminals to try to transmit substantially simultaneously.

The communication device may be configured to take action in response to a network event in dependence on information about that event that it receives from one or more terminals, the communication device being further configured to, if it anticipates that that a network event may trigger the plurality of terminals to transmit, take said action in dependence on information about the network event received from only the subset of terminals.

The communication device may be configured to arrange so that only the subset of terminals attempt to transmit by instructing others of the plurality of terminals not to transmit in response to the network event.

The communication device may be configured to instruct the others of the plurality of terminals to transmit their information relating to the network event at a time when the risk of a plurality of terminals attempting to transmit information relating to the event substantially simultaneously will have subsided.

The communication device may be configured to anticipate that a network event may trigger the plurality of terminals to attempt to transmit their information relating to the network event via contended access.

The communication device may be configured to instruct the others of the plurality of terminals to transmit their information relating to the network event via non-contended access.

The communication device may be configured to instruct the others of the plurality of terminals to transmit their information relating to the network event in transmission slots that had already been allocated those terminals for the transmission of other data.

The communication device may be configured to anticipate that a network event may trigger the plurality of terminals to attempt to transmit in dependence on the type of the network event.

The communication device may be configured to determine that a network event is of a type likely to trigger a number of terminals to attempt to transmit that is sufficient for at least some of those transmissions not to reach the communication device.

The network event may be an alert, and the communication device may be configured to anticipate that the plurality of terminals may attempt to transmit messages informing it of the alert.

The communication device may be configured to determine that an alert has occurred in dependence information received from one or more of the terminals and identify other terminals that are likely to be affected by the alert.

The communication device may be configured to identify other terminals that are likely to be affected by the alert in dependence on a location associated with said one or more of the terminals.

The communication device may be configured to identify other terminals that are likely to be affected by the alert in dependence on a device type associated with said one or more of the terminals.

The communication device may be configured to identify other terminals that are likely to be affected by the alert in dependence on an alert type associated with the alert.

The communication device may be configured to arrange so that only the subset of terminals attempt to transmit in response to the network event by instructing the other terminals to switch from an alert mode to a normal mode.

The network event may be a broadcast message transmitted by the communication device, and the communication device may be configured to anticipate that the plurality of terminals may attempt to transmit requests for retransmission of all or part of the broadcast message.

The communication device may be configured to instruct only the subset of terminals to transmit an indication of how successfully they received the broadcast message.

The communication device may be configured to determine which parts of the broadcast message to retransmit in dependence on the indications transmitted by the subset of terminals.

The communication device may be configured to determine which of the plurality of terminals to transmit to in dependence on the indications transmitted by the subset of terminals.

The communication device may be configured to permit all of the terminals to transmit requests for retransmission in response to a retransmission of all or part of the broadcast message by the communication device.

The communication device may be configured to permit all of the terminals to transmit their request for retransmission via contended access.

The communication device may be configured to operate in a network configured for machine-to-machine communication.

The communication device may be configured to operate in whitespace.

According to a second embodiment of the invention, there is provided a method for communicating with a plurality of terminals, comprising determining that a network event will affect the plurality of terminals and could trigger each of those terminals to attempt to transmit information relating to the network event to the communication device and arranging so that only a subset of the plurality of terminals will attempt to transmit in response to the network event.

BRIEF DESCRIPTION OF THE DRAWINGS

Aspects of the present invention will now be described by way of example with reference to the accompanying drawings. In the drawings.

DETAILED DESCRIPTION

A suitable approach to address the issues described above is for the network to arrange so that the terminals do not all attempt to transmit their unscheduled messages at the same time.

One option is for a communication device to anticipate that a network event may trigger a large number of terminals to attempt to transmit information about the network event at more or less the same time, so that there is a high probability of those messages causing significant network congestion. The anticipated congestion might result in some of the messages not getting through, and might also hinder transmissions unrelated to the network event. The communication device is preferably configured to arrange so that that only a subset of the plurality of terminals attempt to transmit in response to the network event. Those terminals that are not part of the subset may be polled separately. In this way the communication device is able to control the timing and loading of the network because most terminals transmit in response to an instruction from the communication device, rather than in response to the network event (the timing of which is outside the communication device's control).

The communication device may determine that it should take action to prevent contended access being overloaded if it anticipates that many of the terminals will try to transmit substantially simultaneously. For example, if the communication device considers that a large number of terminals will try to use the contended access portion of one particular frame. The communication device may consider the number of terminals to be "large" if it determines that the number of terminals that might try to use the contended access portion of a frame is the same as or exceeds the number of contended access time slots in that particular frame.

The communication device will consequently only receive information about the network event from a subset of terminals, at least initially. The communication device is preferably configured to adopt a particular course of action in response to the network event in dependence on information it receives from just that subset of terminals. The communication device may be configured to determine, either before or after it receives the information from the subset, that that information will be sufficient for it to take an appropriate course of action.

One or more embodiments of the invention will now be described with specific reference to a wireless network shown in FIG. 1. One or more embodiments of the invention will also be described with specific reference to a wireless network in which one of the communication devices is a terminal and the other of the communication devices is a base station. This is for the purposes of example only and it should be understood that the mechanisms described herein may be implemented by any suitable communication network and by any suitable communication device, irrespective of its role in the network.

Figure 1:
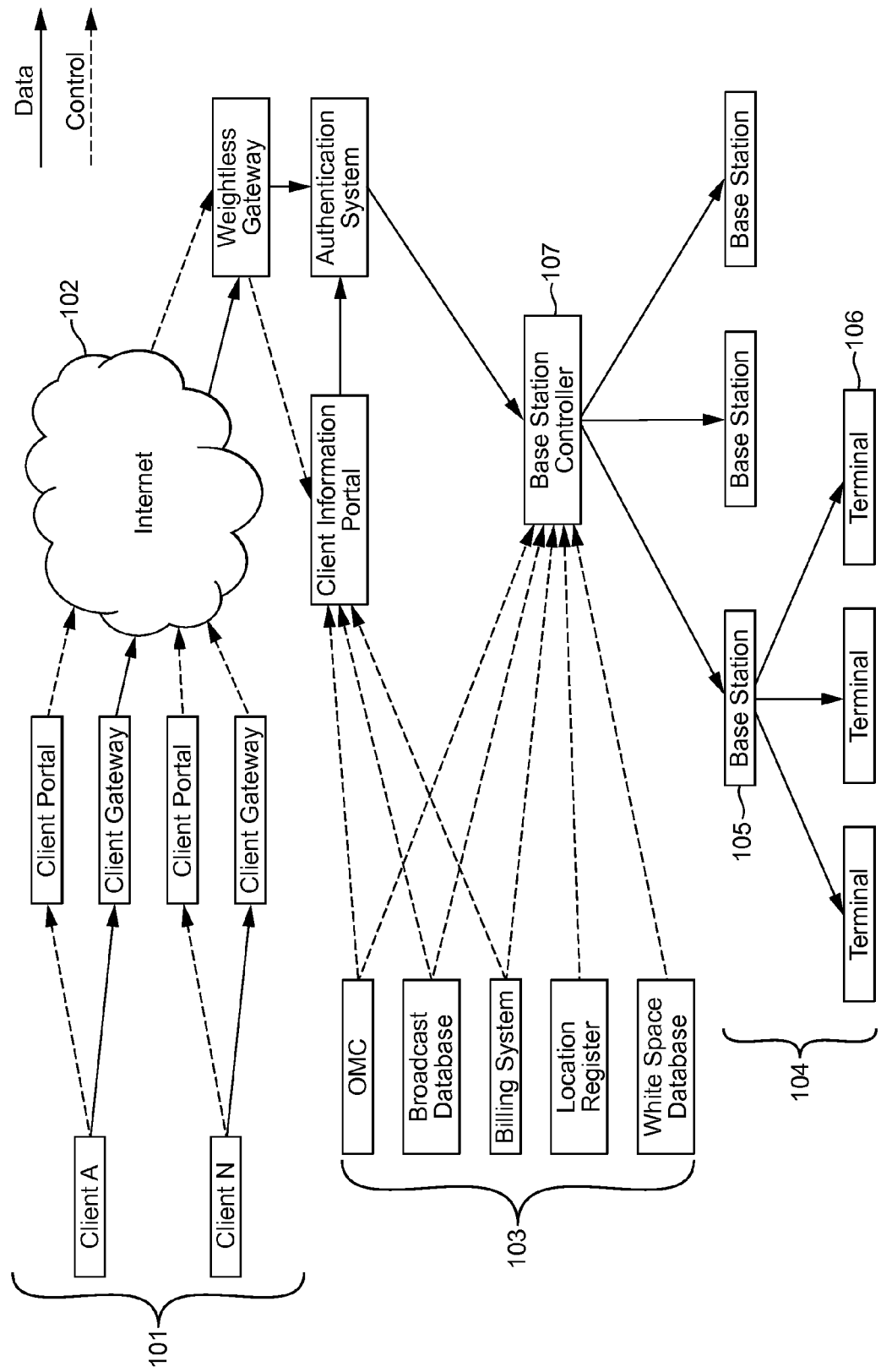
FIG. 1 shows an example of a communication network.

The network in FIG. 1, which is shown generally at 104, comprises one or more base stations 105 that are each capable of communicating wirelessly with a number of terminals 106. Each base station may be arranged to communicate with terminals that are located within a particular geographical area or cell. The base stations transmit to and receive radio signals from the terminals. The terminals are entities embedded in machines or similar that communicate with the base stations. Suitably the wireless network is arranged to operate in a master-slave mode where the base station is the master and the terminals are the slaves. Each base station may be arranged to communicate with a large number of terminals, e.g. a thousand or more.

The base station controller 107 is a device that provides a single point of communication to the base stations and then distributes the information received to other network elements as required. The network may be arranged to communicate with a client-facing portion 101 via the internet 102. In this way a client may provide services to the terminals via the wireless network.

Other logical network elements shown in this example are:

Core network. This routes traffic information between base stations and client networks.
Billing system. This records utilization levels and generates appropriate billing data.
Authentication system. This holds terminal and base station authentication information.
Location register. This retains the last known location of the terminals.
Broadcast register. This retains information on group membership and can be used to store and process acknowledgements to broadcast messages.
Operations and maintenance center (OMC). This monitors the function of the network and raises alarms when errors are detected. It also manages frequency and code planning, load balancing and other operational aspects of the network.
White spaces database. This provides information on the available white space spectrum.
Client information portal. This allows clients to determine data such as the status of associated terminals, levels of traffic, etc.

In practice, many of the logical network elements may be implemented as databases running software and can be provided on a wide range of platforms. A number of network elements may be physically located within the same platform.

A network such as that shown in FIG. 1 may be used for machine-to-machine communications, i.e. communications that do not involve human interaction. Machine-to-machine communications are well-matched to the limitations of operating in white space, in which the bandwidth available to the network may vary from one location to another and also from one time instant to the next. As the network does not have any specific part of the spectrum allocated to it, even unallocated parts of the spectrum may become unavailable, e.g. due to a device in the vicinity that is operating outside of the network but using the same part of the spectrum. Machines are well-adapted to tolerating the delays and breaks in communication that can result from these varying communication conditions. The network should also be adapted to the communication conditions. For example, the network may make use of frequency hopping sequences (which are suitably different for neighboring cells), different data rates (which can be adapted to the signal conditions and technical capabilities of particular terminals), spreading codes (which can also be adapted to the signal conditions and technical capabilities of the terminals) and acknowledgement mechanisms (so that lost packets can be identified and resent).

Figure 2:
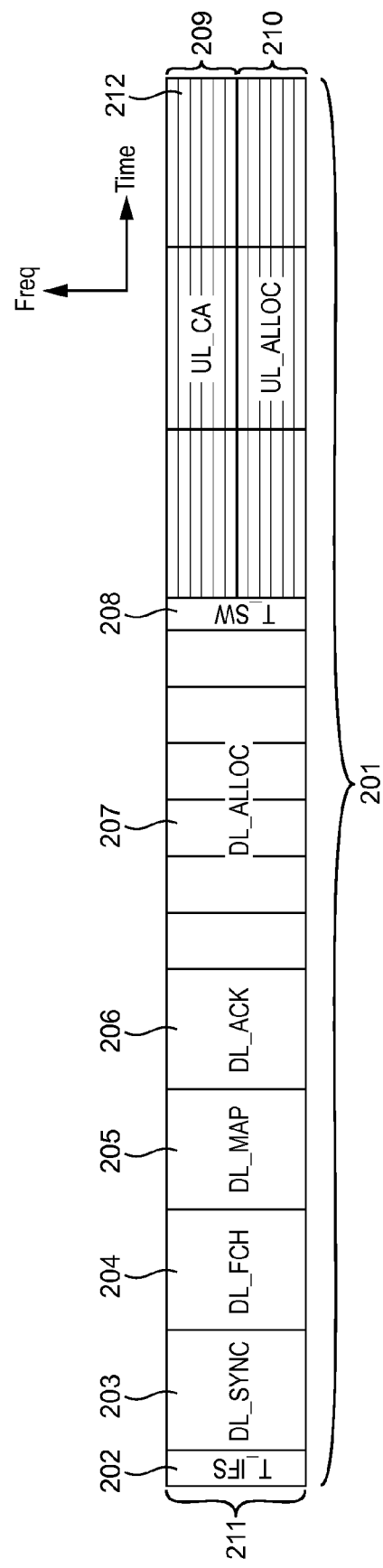
FIG. 2 shows an example of a communication frame.

The base station may use a frame structure to organize communications with the plurality of terminals in its cell. Medium access control (MAC) may be used to share the available radio resource between the plurality of terminals. An example of a suitable frame is shown in FIG. 2. The frame (shown generally at 201) comprises time to ramp-up to full output power 202 (T_IFS), a synchronization burst 203 (DL_SYNC), an information field providing the subsequent channel structure 204 (DL_FCH), a map of which information is intended for which terminal and uplink timeslot allocations 205 (DL_MAP), a field to allow acknowledgement of previous uplink transmissions 206 (DL_ACK) and then the actual information to be sent to terminals 207 (DL_ALLOC). There is then a guard period for ramp-down of the downlink and ramp-up on the uplink 208 (T_SW), followed by channels set aside for uplink contended access 209 (UL_CA) in parallel with the allocated uplink data transmissions 210 (UL_ALLOC).

Each frame is suitably two seconds long. The base stations may be arranged to periodically transmit a broadcast frame that all terminals should listen to as far as possible. This frame may be transmitted around once every 15 minutes, and may be considered to form the first frame of a "super-frame". The frame may be known as the "broadcast channel". The frequency of this frame is a trade-off. If it is too frequent the terminals will consume excessive battery power listening to the broadcast frames. If it is too infrequent, it may take too long to "page" or "poll" terminals and the frequency with which network parameters can be changed decreases.

A terminal may be configured to apply a designation to the data that it intends to transmit over the network. For the most part, data will be designated for transmission in scheduled time slots. The terminal may designate some data device as being unscheduled data. When the terminal has unscheduled data to send, it may either wait to receive an allocated slot for that data from the base station or send it via contended access. The terminal may choose between those two options in dependence on an urgency associated with the transmission of that data. Data that is designated for transmission at the earliest possible opportunity will normally be transmitted via contended access.

A terminal is able to deduce the number of contended access timeslots available in a particular frame and their size on decoding the header. The terminal may select a random number between 0 and the number of contended-access bursts available and attempt to access the contended-access slot corresponding to that number.

A problem arises when a large number of terminals have unscheduled data that they try to transmit at around the same time. A surge in contended-access attempts has the potential to overwhelm the network. This situation may occur when a single network event affects a large number of terminals, triggering them to try to transmit information about that event to the network. The transmissions from the terminals may collide with each other as they try to access the same contended access slots, with the risk that many of the messages may not get through to the network. Furthermore, a surge in contended access attempts may hinder terminals trying to transmit other unscheduled data, which in some cases may be urgent. For example, medical equipment might be hindered from transmitting vital information about a change in a patient's condition if many other terminals are competing for contended access slots at the same time.

The mechanisms described herein for anticipating and avoiding large numbers of contended access requests being made simultaneously may be usefully applied in any situation in which a large number of terminals can be expected to try to transmit at the same time. The general principles of these mechanisms are described below with specific reference to two particular examples of network event: the occurrence of an alert condition and the transmission of a broadcast message. It should be understood that this is for the purposes of example only and is not intended to limit the scope of the invention to any particular network event. Also, any particular mechanism described below with reference to one specific example of network event may be equally applied to the other example, or indeed to any other network event.

Suitably, a terminal is arranged to inform the network if it detects an alert condition. Often this requires the terminal to make an unexpected transmission, usually by sending an alert message to the base station it is registered with. The terminal may designate the alert message as relating to unscheduled data. The terminal may also designate the alert message as data that should be transmitted at the earliest available opportunity. The terminal will typically try to transmit the alert message as quickly as possible via contended access.

An alert condition might be a situation that negatively impacts the terminals and/or the network's ability to function. An alert condition might be a situation that is of concern to clients. Clients may have the ability to set what they consider to be an alert condition. Examples of alert conditions may include power cuts, sensor readings that have exceeded a predetermined threshold, the triggering of an alarm etc.

A base station may act to forestall unnecessary alerts when it receives one or more alert messages and anticipates that other terminals are likely to send similar messages. This situation may occur when a single alert condition affects many terminals in a cell. The base station may send a message to some or all of the terminals informing them that it is aware of the alert condition. This message may instruct the terminals not to send their alert messages at that time. The base station may also instruct the terminals to do one or more of the following:
 delay sending their alert message via contended access;
 send their alert message via allocated access;
 send their alert message in a newly allocated time slot;
 send their alert message in an already allocated time slot;
 wait to send their alert message until polled by the base station; or
 not send their alert message at all.

The base station may select one of the above options based on, for example, the type of the alert condition, the number of terminals it believes will be affected by the alert, how heavily loaded the network is and what the client has chosen to happen in the event of an alert affecting one or more of its terminals. The base station may select different options for different terminals. For example, the base station may choose to poll some of the terminals at a later time and instruct the other terminals not to send their alert message at all.

The base station may send the indication that it is aware of the alert to all of the terminals in the cell or only to a subset. The subset of terminals could be selected based on which terminals the base station considers to be likely to be affected by the alert. It may be that the alert condition is limited to a particular geographical region of the cell or a particular class or type of terminal (e.g. electricity meters). The base station may select which terminals to send the indication to based on a class of device associated with the terminal(s) from which it has already received an alert message, a location associated with the terminal(s) from which it has already received an alert message, a type of alert indicated by the alert message etc.

For example, on receiving two or more power failure messages in the same geographical area, a base station might send out a message to all meters within its coverage area informing them that it is aware of a power failure problem. The base station may also instruct the meters to use their next scheduled transmission slot, which would normally be used to send a meter reading, to inform the network of their power status. Alternatively the base station may poll the terminals individually when it is ready to receive their alert messages.

Another option is for the base station to restrict access to the contended access portions of the frames that are communicated immediately after it first becomes aware of the alert. For example, the base station may include information restricting access to contended access in the header section of that frame. The base station may open/close contended access to alert messages by assigning a particular number of slots to contended access in each frame, by limiting the contended access slots in a frame to being accessed by a particular type of terminal (e.g. restricting contended access to medical devices only) and/or by restricting contended access to messages of a particular type (for example, alert messages might be a particular type of message that the base station can exclude from contended access).

The terminals may be configured to have a normal state and an alert state, with the terminal moving to the latter after detecting an alert. In the alert state the terminal may try to transmit its alert message as soon as possible via contended access. The terminal may remain in its alert state even when instructed by the base station not to send its alert message via contended access if the base station indicates that it will poll it later for its alert message. The terminal may return to its normal state when it has sent its alert message or when it receives an instruction from the base station not to send its alert message.

The base station is preferably configured to determine that a message is of type "alert", e.g. by means of a specific bit that is set in the message.

Figure 3:
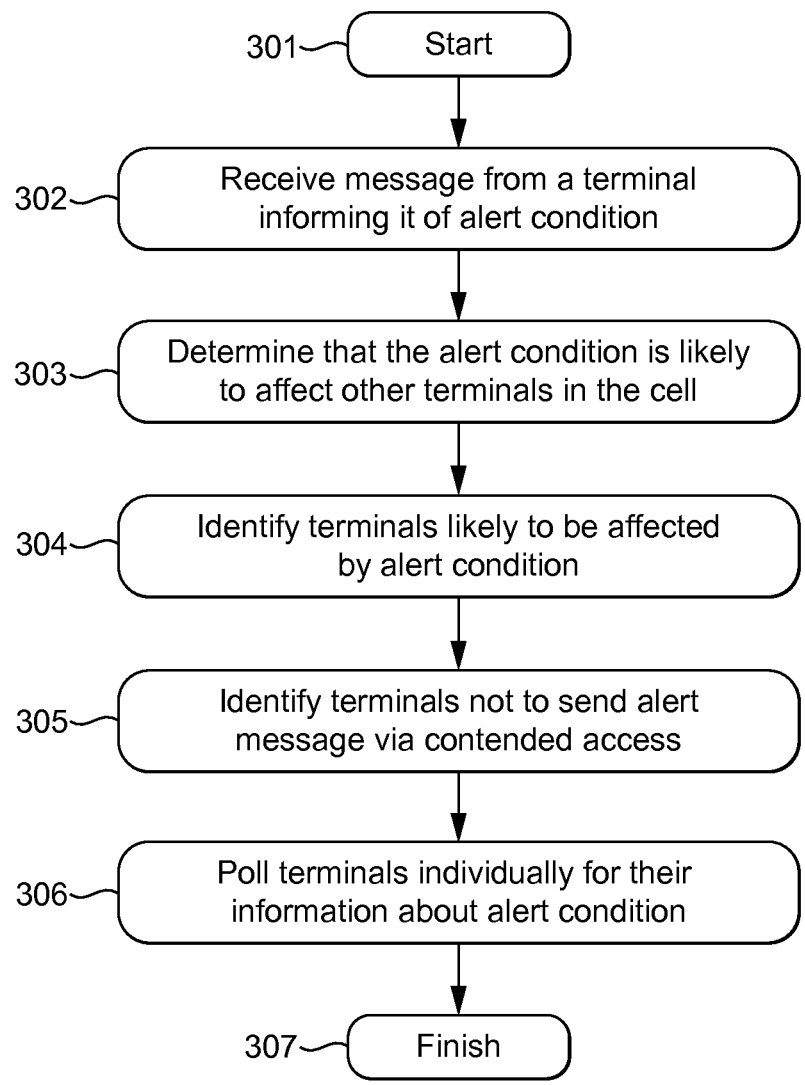
FIG. 3 shows an example of a process that may be implemented by a base station.

An example of a process that might be performed by a network device, such as a base station, under this approach is illustrated in FIG. 3. The process starts in step 301. In step 302 the base station receives a message from a terminal informing it of an alert condition. The base station determines that this alert condition is likely to affect other terminals in the cell (step 303), so it determines a group of terminals likely to be affected by the alert condition (which in a straightforward case could simply be "all terminals in cell") and transmits an instruction to that group of terminals not to send their alert messages via contended access (steps 304 and 305). The base station then polls the terminals individually for their alert messages once the danger of the network being overloaded has past (step 306). The process terminates in step 307.

Figure 4A:
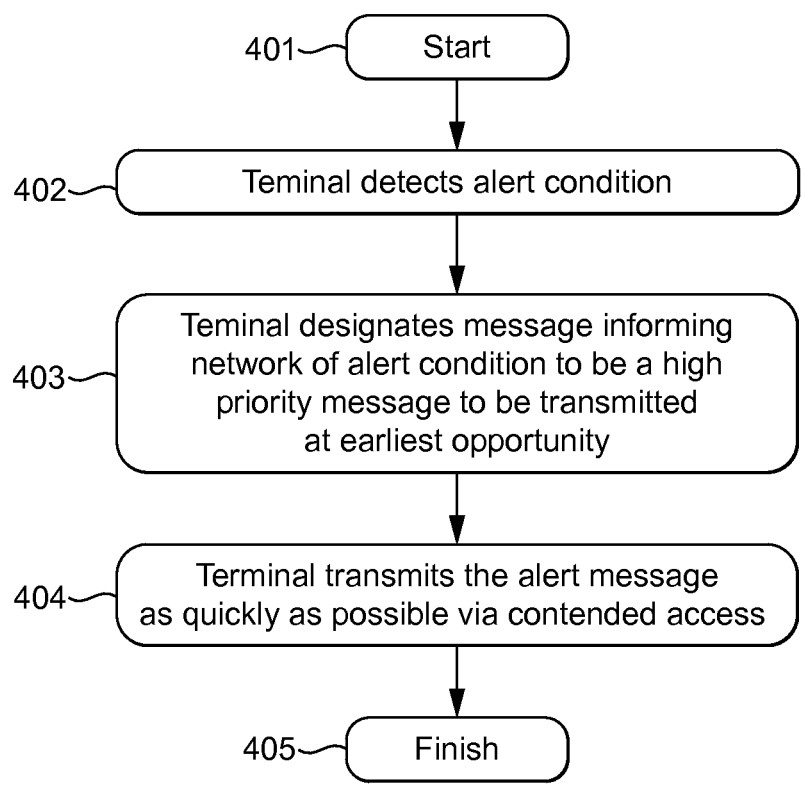
FIGS. 4a and b show examples of processes that may be implemented by a terminal.

An example of a process that might be performed by a terminal that enters its alert state on detecting an alert is illustrated in FIG. 4a. The process starts in step 401. The terminal detects an alert condition, such as a power failure, in step 402 and enters its alert state. The terminal is configured to inform the network of this alert condition by transmitting a message to the base station. The terminal designates this message as being of high priority, so that it is transmitted at the earliest opportunity (step 403). In practice, this is likely to mean that the terminal will attempt to transmit the message via contended access (step 404), although it is possible that the terminal might use its next scheduled slot instead if this is likely to prove quicker (however, in the majority of situations, it is likely that the terminal will prefer to use contended access since the alert message is classified as unscheduled data). The process terminates in step 405 once the alert message has been sent.

Figure 4B:
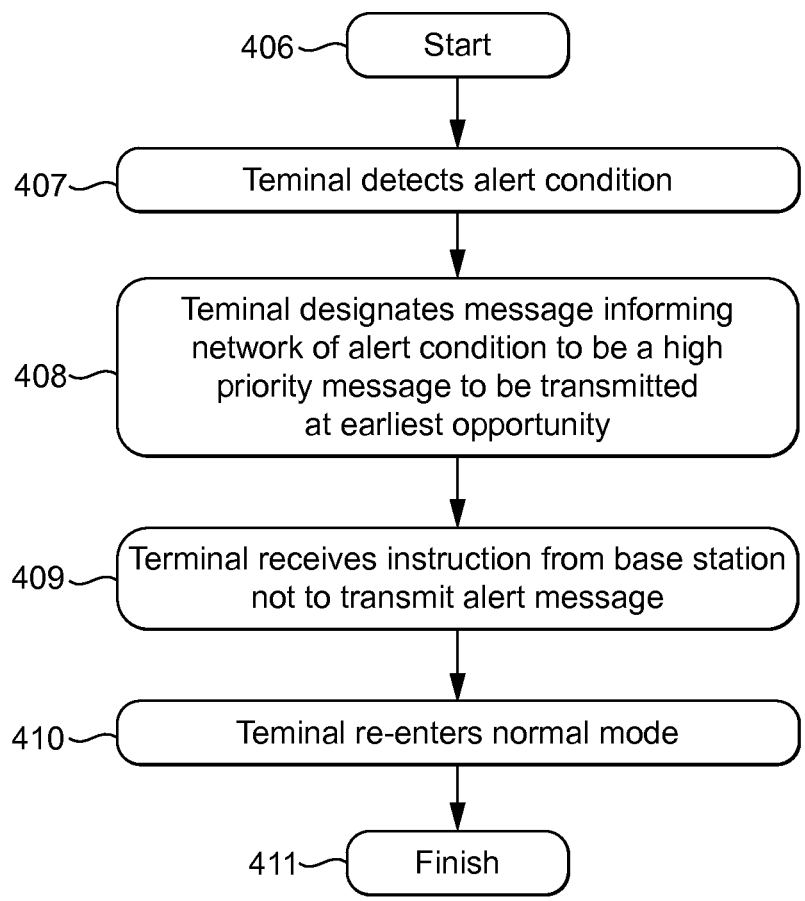

An example of a process that might be performed by a terminal that is instructed by the base station to re-enter its normal state is illustrated in FIG. 4b. The process starts in step 406. In step 407 the terminal detects an alert condition and enters its alert state accordingly. The terminal designates its alert message as a message to be transmitted at the earliest possible opportunity (step 408). The terminal then receives an indication from the base station that the base station is already aware of the alert condition and instructing it not to send its alert message (step 409). The terminal then returns to normal mode (step 410). The process terminates in step 411.

The process shown in FIG. 4b is only one possible example. In another example the base station might instruct the terminal to wait until it is polled before transmitting its alert message rather than not to transmit it at all. In this scenario, the terminal will not re-enter normal mode until it has transmitted its alert message to the base station.

Advantages of one or more of the embodiments described above may include ensuring that the network is able to timely gather information on an alert without the risk of overloading the resources of the network with a deluge of messages relating to the same alert. The network is able to control when and how those messages should be transmitted.

Another example of a network event that may trigger a flood of contended access requests is when a single message is broadcast to multiple terminals in a cell.

Broadcast messages are an efficient way of communicating data to multiple terminals. However, sometimes the data may not be successfully received by every terminal, particularly in networks where an individual cell covers a large geographical area and encompasses a wide range of terminals with different communication capabilities. To address this issue, the data could be retransmitted a predetermined number of times in the hope all terminals successfully receive it. However, this is not reliable. Another option would be for the base station to check with each individual terminal to ensure that it has received the data. For a typical busy base station, this is likely to take too long. A further option would be for the base station to accept contended access messages back to the base station from terminals requesting retransmission of some or all of the broadcast message. However, in a busy network the base station could be flooded with contended access retransmission requests. If many terminals request retransmission then it is likely that base station cannot receive any of them.

A preferred option is for the base station to forestall multiple retransmission requests via contended access by temporarily closing contended access for retransmission requests while it communicates directly with some of the terminals in the cell. The base station preferably asks a subset of the terminals to which the original message was broadcast whether they successfully received the message. From the results of this sample, the base station may build a list of fragments of the broadcast message to retransmit. The base station may then retransmit only those fragments, rather than the entire message.

Once the process of sampling of terminals and retransmitting the required fragments has been completed, the base station may open up contended access for retransmission requests. The sampling and retransmitting process may be repeated several times. This process should reduce the load on the contended access channel.

The base station may select terminals to form part of the sampling group in a number of ways. For example, the base station may select the subset based on random sampling, based on knowledge of the terminals' locations within the cell and the radio mode they require (compared, for example, with the radio mode the broadcast was transmitted on), or based on a specific group associated with the terminals (for example, based on function associated with those terminals, a type associated with those terminals or a dedicated group that all of those terminals belong to).

The base station may open/close contended access to retransmission requests by assigning a particular number of slots to contended access in each frame, by limiting the contended access slots in a frame to being accessed by a particular type of terminal (e.g. restricting contended access to medical devices only) and/or by restricting contended access to messages of a particular type (for example, retransmission requests might be a particular type of message that the base station can exclude from contended access).

Figure 5:
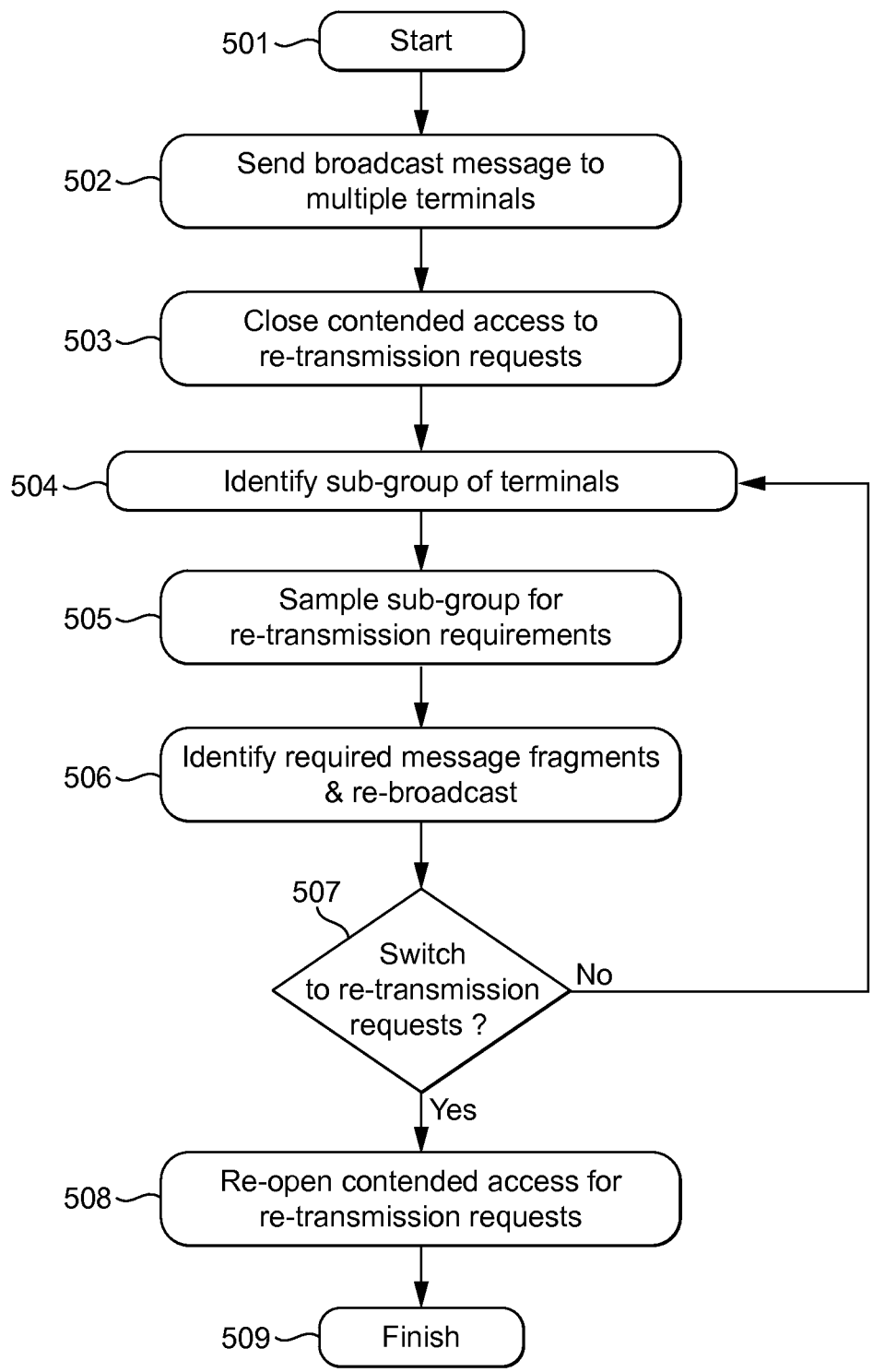
FIG. 5 shows an example of a process that may be implemented by a base station.

An example of a process that may be performed by a base station wanting to pre-empt retransmission requests from multiple terminals is shown in FIG. 5. The process starts in step 501. In step 502 the base station sends a broadcast message to multiple terminals. The base station anticipates that a large number of retransmission requests might result from this network event and accordingly closes contended access to retransmission requests (step 503). The base station then identifies a sub-group of terminals to ask about what parts of the broadcast they didn't receive (step 504) and samples those terminals (step 505). The base station then rebroadcasts the required messages fragments (step 506).

The fragments will normally be rebroadcast to all of the terminals to which the original message was sent. However, the rebroadcast could be restricted to a subset of the original terminals. For example, the base station may exclude any terminals in the sample group that successfully received all of the original message. The base station may then determine whether it is time for it to reopen contended access to retransmission requests or whether it should continue with the sampling process (step 507). This decision may be made in dependence on, for example, the current traffic load in the cell, the number of fragments that needed retransmitting in the last iteration and/or the number of times that the sampling process has already been performed. If the base station determines that it is not yet time to re-open contended access, it repeats the sampling process. The base station may use the same set of sample terminals as during previous iterations or may select a different set. If the base station determines that it should switch to retransmission requests, it reopens contended access (step 508). The process terminates in step 509.

Figure 6:
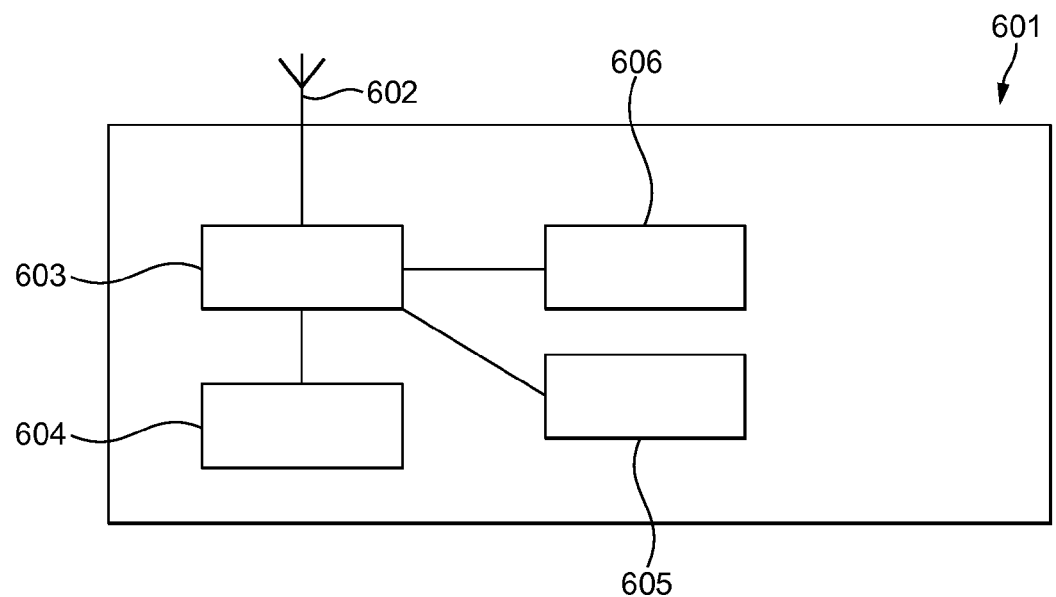
FIG. 6 shows an example of a communication device.

An example of the functional blocks that may be comprised in a communication device according to one embodiment of the invention are shown in FIG. 6. The communication device, shown generally at 601, comprises a communication unit 603 connected to an antenna 602 for transmitting and receiving messages. The communication device further comprises an anticipation unit 604 for determining when a network event is likely to trigger a large number of contended access messages. The anticipation unit may be configured to make this determination in dependence on an alert condition that is affecting one or more terminals in its cell. This unit may be configured to make the determination in dependence on one or more alert messages already received from the terminals or in dependence on an indication from the network (e.g. based on information that the core network has gathered from other base stations or cells or from an external source such as a client). The anticipation unit may also determine a type associated with the alert and/or that the alert is likely to affect multiple terminals so that a deluge of alert messages can be expected if no action is taken. The anticipation unit may also be configured to determine that a network event is likely to trigger a large number of contended access messages if it is about to send a broadcast message to multiple terminals in the cell.

The communication device further comprises a scheduling unit 606 for determining when and how the terminals should transmit their contended access messages, whether these are alert messages or retransmission requests. The communication device also comprises a group unit 606 for determining which terminals are likely to be affected by the alert condition and/or for selecting a sub-group of terminals for sampling. The communication unit may effectively act as a central controller and may pass information between the other functional blocks.

Figure 7:
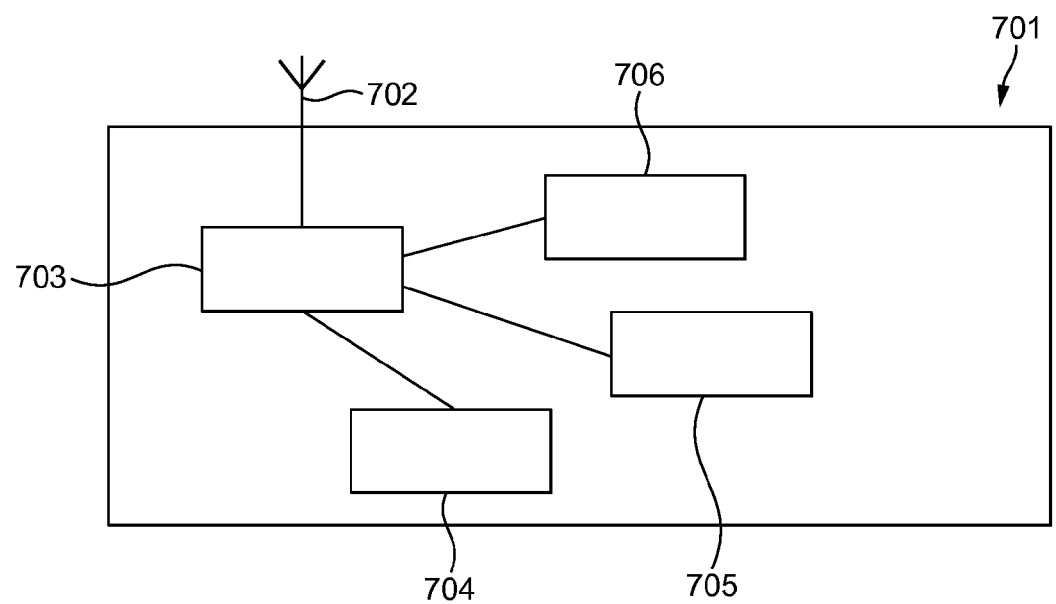
FIG. 7 shows an example of another communication device.

An example of the functional blocks that may be comprised in a communication device according to another embodiment of the invention are shown in FIG. 7. The communication device, shown generally at 701, comprises a communication unit 703 connected to an antenna 702 for transmitting and receiving messages. The communication device further comprises an alert unit 704 for determining that it is being affected by an alert condition. The communication device comprises a designation unit 705 for determining how particular messages should be transmitted and associating them with a particular designation accordingly. The communication device also comprises a mode unit 706 for determining when the communication device should switch between alert mode and normal mode. The communication unit may effectively act as a central controller and may pass information between the other functional blocks.

The apparatus in FIGS. 6 and 7 are shown illustratively as comprising a number of interconnected functional blocks. This is for illustrative purposes and is not intended to define a strict division between different parts of hardware on a chip. In practice, the communication devices preferably use a microprocessor acting under software control for implementing the methods described herein. In some embodiments, the algorithms may be performed wholly or partly in hardware.

The mechanisms described herein might be most beneficially implemented by a communication device acting as a base station and/or a communication device that is acting as a terminal. However, the communication device might perform any role in the network.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

What is claimed is:

1. A communication device for communicating with a plurality of terminals, the communication device being configured to:
   receive at the communication device a message from at least one of the terminals informing the communication device that said terminal has detected an alert condition, causing the terminal to enter an alert mode;
   determine at the communication device that others of the plurality of terminals may attempt to transmit messages to the communication device informing the communication device that they have detected the same alert condition;
   identify at the communication device other terminals of the plurality of terminals that are likely to be affected by the same alert condition;
   arrange so that only a subset of those other terminals attempt to transmit a message to the communication device in response to the alert condition; and
   instruct the others of the plurality of terminals to transmit their information relating to the alert condition via non-contended access.

2. A communication device as claimed in claim 1, configured to determine that the alert condition may trigger the plurality of terminals to try to transmit simultaneously.

3. A communication device as claimed in claim 1, configured to take action in response to a network event in dependence on information about the alert condition that it receives from the at least one terminal, the communication device being further configured to, if it determines that that a network event may trigger the plurality of terminals to transmit, take said action in dependence on information about the alert condition received from only the subset of terminals.

4. A communication device as claimed in claim 3, configured to anticipate that the alert condition may trigger the plurality of terminals to attempt to transmit their information relating to the network event via contended access.

5. A communication device as claimed in claim 1, configured to anticipate that the alert condition may trigger the plurality of terminals to attempt to transmit in dependence on a type of network event causing the alert condition.

6. A communication device as claimed in claim 1, configured to determine that the alert condition is likely to trigger a number of terminals to attempt to transmit that is sufficient for at least some of those transmissions not to reach the communication device.

7. A communication device as claimed in claim 1, configured to identify other terminals that are likely to be affected by the alert condition in dependence on a location associated with said one or more of the terminals.

8. A communication device as claimed in claim 1, configured to identify other terminals that are likely to be affected by the alert condition in dependence on a device type associated with said one or more of the terminals.

9. A communication device as claimed in claim 1, configured to identify other terminals that are likely to be affected by the alert condition in dependence on an alert type of the alert condition.

10. A communication device as claimed in claim 1, configured to operate in a network configured for machine-to-machine communication.

11. A communication device as claimed in claim 1, configured to operate in a whitespace part of the spectrum.

12. A communication device for communicating with a plurality of terminals, the communication device being configured to:
  receive at the communication device a message from at least one of the terminals informing the communication device that said terminal has detected an alert condition, causing the terminal to enter an alert mode;
  determine at the communication device that others of the plurality of terminals may attempt to transmit messages to the communication device informing the communication device that they have detected the same alert condition;
  identify at the communication device other terminals of the plurality of terminals that are likely to be affected by the same alert condition;
  arrange so that only a subset of those other terminals attempt to transmit a message to the communication device in response to the alert condition; and
  instruct the others of the plurality of terminals to transmit their information relating to the alert condition via non-contended access;
  wherein the alert condition is associated with a broadcast message transmitted by the communication device, the communication device being configured to anticipate that the plurality of terminals may attempt to transmit requests for retransmission of all or part of the broadcast message.

13. A communication device as claimed in claim 12, configured to instruct only the subset of terminals to transmit an indication of how successfully they received the broadcast message.

14. A communication device as claimed in claim 13, configured to determine which parts of the broadcast message to retransmit in dependence on the indications transmitted by the subset of terminals.

15. A communication device as claimed in claim 13, configured to determine which of the plurality of terminals to transmit to in dependence on the indications transmitted by the subset of terminals.

16. A communication device as claimed in claim 12, configured to permit all of the terminals to transmit requests for retransmission in response to a retransmission of all or part of the broadcast message by the communication device.

17. A communication device as claimed in claim 16, configured to permit all of the terminals to transmit their request for retransmission via contended access.

18. A method for communicating with a plurality of terminals, comprising:
  receiving at a communication device a message from at least one of the terminals that said terminal has detected an alert condition. causing the terminal to enter an alert mode;
  determining at the communication device that others of the plurality of terminals may attempt to transmit messages informing the communication device that they have detected the alert condition;
  identifying at the communication device other of the plurality of terminals that are likely to be affected by the alert condition;
  arranging so that only a subset of those other terminals attempt to transmit in response to the alert condition; and
  instructing the others of the plurality of terminals to transmit their information relating to the alert condition via non-contended access.

* * * * *